April 1, 1969 C. F. CHONG 3,436,743

MEMORY ORGANIZATION FOR PREVENTING CREEP

Filed Dec. 21, 1964

INVENTOR
CARLOS F. CHONG

BY Rene A. Kuypers

ATTORNEY

United States Patent Office 3,436,743
Patented Apr. 1, 1969

3,436,743
MEMORY ORGANIZATION FOR PREVENTING CREEP

Carlos F. Chong, Philadelphia, Pa., assignor to Sperry Rand Corporation, New York, N.Y., a corporation of Delaware Filed Dec. 21, 1964, Ser. No. 419,937
Int. Cl. G11b *5/00*
U.S. Cl. 340—174 10 Claims

ABSTRACT OF THE DISCLOSURE

In order to eliminate the effect of adjacent bit disturbs during the recording cycle of a memory wire having a continuously coated magnetic medium, the organization is arranged in one of two ways. In one way, the memory words are arranged along the wire memory and recording is accomplished bit serially so that adjacent bit disturbs are minimized. In a second way, the words are arranged conventionally along the drive line and are divided into groups. Every time a word is written into a word location of the group, all the words of the group are re-recorded.

This invention relates in general to the recording of information on a magnetic medium. In particular, this invention relates to the recording of information on a magnetic medium requiring high density packing.

One of the problems encountered, for example, in the use of a continuous magnetic medium digital memory device is that high density packing of the bits along the medium is not readily obtained. The reason for the above problem is that the creep effect along the medium is difficult to control. As is well known, creep consists of the increase in length of a magnetized section on a continuous magnetic medium due to the repeated writing of the same information in a particular bit position. The creep effect is a serious problem in digital devices in that it leads to the introduction of errors into the arithmetic registers and other data processing elements of a computer. One way to combat creep in continuous magnetic mediums as well as to minimize adjacent bit disturbs in non-continuous mediums is to separate the variout bits by a wide distance. However, this solution is not satisfactory in a memory which is extremely large, as for example, a hundred million bit since the physical size of memory would become very large.

It is therefore an object of this invention to provide a that there is a need for a memory which has a high bit capacity, a high packing density and is unaffected by adjacent bit disturbs. In other words, there is a need for a large memory device of the order of 100 million bits or greater and has a bit packing density of 25 bits per inch or better but which does not require excessive physical dimensions to accommodate this large number of bits.

It is therefore an object of this invention to provide a new and improved memory organization.

It is a further object of this invention to provide a memory system which achieves improved packing density.

It is a still further object of this invention to provide a new and improved memory organization, which makes a large scale memory device utilizing a continuous magnetic medium, readily feasible.

It is another object of this invention to provide a memory device wherein adjacent bit disturbs are minimized.

It is yet another object of this invention to provide a memory organization which minimizes the effect of creep in thin, magnetic film mediums.

In accordance with a feature of this invention, there is provided in one embodiment a memory organization for a large scale memory device utilizing a continuous magnetic medium wherein the memory words are formed along the medium itself. In other words, if the continuous magnetic medium is, for example, a plated magnetic wire, a plurality of drive lines are positioned substantially orthogonal to the plated wire so that the intersection of a plated wire and a drive line comprises a bit position. These drive lines in cooperation with one plated wire form a memory word. This is opposed to the conventional manner of plated wire memory organization wherein the various bits of a memory word are formed by a plurality of plated wires in conjunction with a a single drive line. The invention also provides that several words may be oriented along the same plated wire, each word being separated by a distance which is greater than the distance between the respective drive lines of a particular word. Information is recorded and read out of this memory organization serially bit by bit. Therefore, the number of adjacent bit disturbs is then bounded, that is, each bit of a word during a record cycle receives only one disturb from the following bit, one from the next bit beyond and so on. In other words, this embodiment restricts the number of disturbs to only one from each adjacent bit so that the creep effect is minimized or virtually eliminated. As a result, improved packing density is readily obtained.

In accordance with another embodiment of this invention, there is provided a memory organization wherein a plurality of continuous magnetic medium such as plated wires are placed substantially parallel to one another. Orthogonally positioned to the plated wires are a number of drive lines. Each drive line in conjunction with the plated wires forms a memory word. To this extent, this embodiment is identical to prior art plated wire memory organization. However, the feature of this embodiment is that the plurality of words consisting of drive lines is separated into groups. Furthermore, the separation between the various word groups is greater than the respective distances between the drive lines of a particular group.

In the last discussed memory organization, an entire word group has its stored information re-recorded every time that a single word in the group has new information recorded therein. In other words, the information already recorded in the various word positions is reinforced every time that new information is recorded in one of memory addresses of the group. Improved packing density is also obtained by this memory organization since it is virtually impossible to alter the information stored in the adjacent bit positions next to the newly recorded word of the group by the above discussed creep effect.

Novel features that are considered characteristic of this invention are set forth with particularity in the appended claims. The invention itself, however, both as to its organization and method of operation, as well as additional objects and features thereof, will best be understood in the following description considered in conjunction with the accompanying drawing, wherein:

Figure 1:
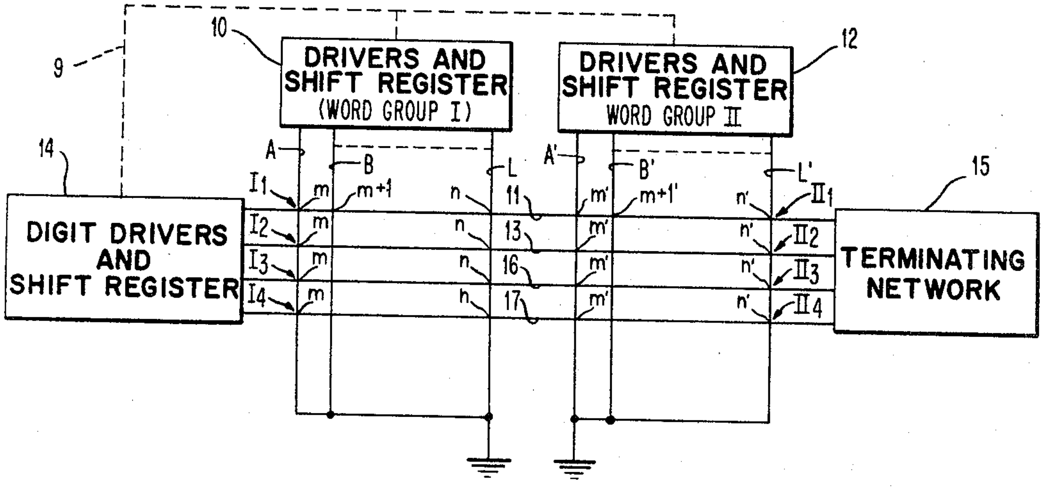
FIGURE 1 is the memory organization in accordance with this invention wherein the words of the memory are located along the continuous magnetic medium and are separated into groups of words.

Referring now to the drawing and in particular FIGURE 1, there is depicted a memory organization wherein the words of the memory are located along the various wires 11, 13, 16 and 17. The wires 11, 13, 16 and 17 have a continuous magnetic covering which can be magnetized in one of two remanent states. By way of example, the wires 11, 13, 16 and 17 may be plated magnetic wires, although the invention is not restricted thereto.

The plated wires 11, 13, 16 and 17 conventionally are five mil diameter beryllium copper rods or wires. A thin magnetic film Permalloy (i.e., 80% nickel-20% iron alloy) approximately ten thousand angstroms thick is plated on the surface of the above mentioned wires. The Permalloy coating is electroplated in the presence of a circumferential magnetic field that establishes a uniaxial anisotropy axis at right angles (i.e., around the circumference) to the lengths of the wire. The uniaxial anisotropy establishes a preferred axis of magnetization (i.e., an easy axis as compared with a hard axis of magnetization) and the magnetic moment of the thin film are normally oriented in one of two equilibrium positions along the easy axis, thereby establishing the two bistable states necessary for binary logic operation.

FIGURE 1 further depicts a plurality of drive lines A to L and A′ to L′ which are placed substantially perpendicular to the plated wires 11, 13, 16 and 17. It is further seen that the drive lines A to L and A′ to L′ are the respective elements of two groups. For the purposes of identification, the two word groups are identified as word group I and word group II. The one group of drive lines A–L is separated from the other group of drive lines A′–L′ by a distance which is greater than the distance between respective drive lines of any one group. In a particular embodiment the separation is .075 inch. As is well known in the plated wire memory art, the intersection of any drive line with a plated wire is designated as a bit position. Any bit position is adapted to store a binary zero or binary one.

As was briefly mentioned above, the various memory words of word group I and II lie along the plated wires 11, 13, 16 and 17. Thus, the words comprising word group I are identified as words I1, I2, I3 and I4. Similarly, the words comprising word group II are identified as words II1, II2, II3 and II4. By way of further identification in the gure, the first bits of the words I1, I2, I3 and I4 are designated by $m$ and the last bits thereof by $n$; also, the first bits of words II1, II2, II3 and II4 are designated by $m'$ and the last bits by $n'$.

It should be noted that the drive lines comprising word group I are each respectively connected to a driver circuit and shift register 10. The other ends of the drive lines are all connected to a common ground. In like manner, the drive lines of word group II are each connected to a drive circuit and shift register 12 and the free terminals thereof are all connected to ground potential. The plated wires 11, 13, 16 and 17 are all connected at one end to a digit driver 14 and a shift resistor and at the free end to a terminating network 15 which may be a ground bus. In an actual embodiment, the shift registers of the word and digit drivers may be combined into a single shift register. As is understood in the art, the circuitry above described is sufficient to enable one to discuss a memory write cycle. Additional circuitry required for a memory read operation such as sense amplifiers has been omitted for purposes of simplicity in the embodiment of FIGURE 1.

It has been observed that transverse fields emanating from a drive line in combination with a digit field produced by a digit driver during a write operation causes the effect known as creep. Thus, if we consider the bit position $m$ of the word I4, it can be demonstrated that the leakage field from the energized drive line $a$ in combination with a maximum amplitude field in the bit line 17 can cause an eventual alteration of the information stored in the next adjacent bit position to $m$. In some cases, such alteration requires millions of cycles of recording the same bit information (a binary zero or binary one). Since the creep or disturb effect is a function of the number of disturbs upon an adjacent bit, it is proposed in accordance with this invention to impose a bound or restriction on the number of disturbs that one bit can impose upon an adjacent bit.

The above can be demonstrated by an example. If new information is to be recorded in the word I4, the new information will be recorded at the various bit positions from $m$ to $n$, one at a time (i.e., serially by bit). Information is recorded in any bit position by energizing a drive line by means of its associated driving circuit and simultaneously applying a steering current of correct polarity to the bit line by means of a digit driver. Therefore, to record information in the word I4 the drive lines A to L are sequentially energized by the shift register and the digit driver is also sequentially and simultaneously energized by a shift register so that steering currents of proper polarity are supplied to the bit line 17. The dotted line 9 between the driver and shift register 10 and the digit driver and shift register 14 indicates that the word drivers and the digit drivers track so that information is recorded in the proper bit position. In such an arrangement, the recording of new information in bit $m+1$ can only disturb the adjacent bit $m$ but once, and similarly, the recording of information in the adjacent bit $m+2$ (not shown) can only disturb the adjacent bit $m+1$ but once. The foregoing is true because during a write operation, a whole word is written and therefore to whatever degree the bit $m$ in I4 might be disturbed by writing in bit $m+1$, this disturbance effect will not impair the information in bit $m$ since it is not repetitive. This is what is meant by the expression that the adjacent bit disturbs are bounded. In other words, in accordance with the subject memory organization, while it is possible to keep recording the same information in one particular bit position, at the same time all the adjacent bits are rerecorded and this will not permit a creeping action into an adjacent memory bit.

Let us now assume the worst case situation wherein, new information is being written into the memory word address I4 one million times and the end bit $n$ thereof always has a binary one recorded therein. Let us further assume that the bit $m'$ of the word II4 of word group II has a binary zero stored therein. If the bit $m'$ of word II4 were positioned close enough to the bit $n$ of the word I4, it would be possible for the bit $n$ to creep physically along the plated wire 17 and eventually alter the information by changing the bit $m'$ to a binary one. In accordance with this invention, the separation into word groups eliminates such a possibility. As discused above, the embodiment of FIGURE 1 eliminates creep in a particular word group by recording information serially, bit by bit, and prevents creep between adjacent word groups by separating them by an appropriate distance.

Since the disturb effect (i.e., creep) is a function of the number of disturbs upon adjacent bits and since in this invention the maximum disturb effect is one, the memory bits in the embodiment of FIGURE 1, can be packed very closely together. This is of extreme importance when the memory is extremely large as for example, a memory having a bit capacity of one hundred million or greater.

Figure 2:
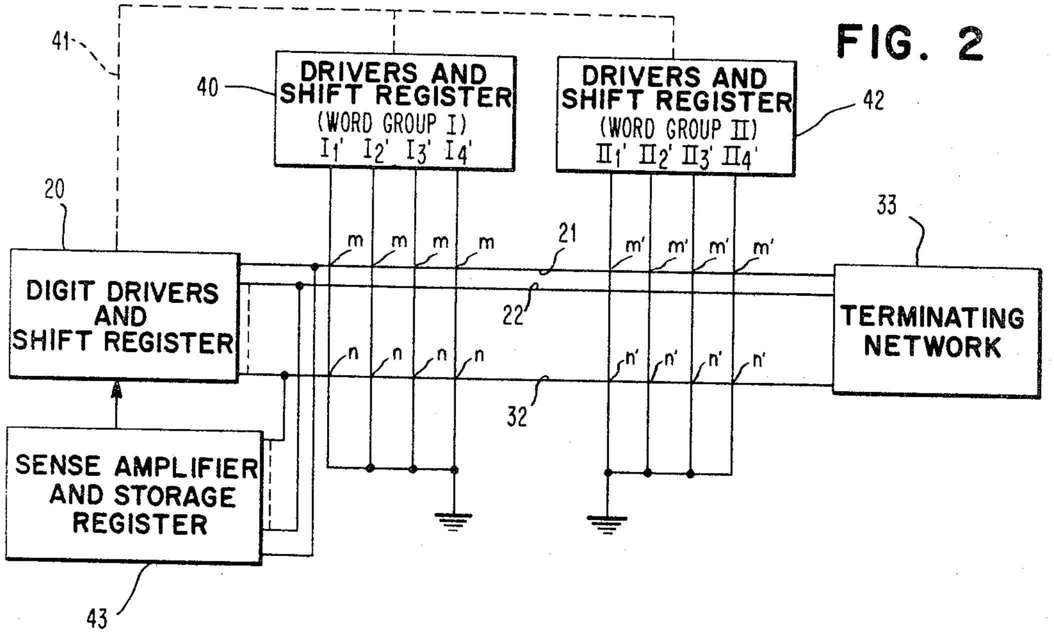
FIGURE 2 is another memory organization provided by the instant invention wherein the words of the memory are located along the various drive lines and are divided into groups of words.

Another embodiment in accordance with this invention is shown in FIGURE 2. In this particular embodiment, the plated wires 21 to 32 are horizontally arranged. One end of the plated wires terminate in the digit driver and shift register 20 as well as the sense amplifier and storage register 43 and the other ends thereof are connected to the terminating network 33 which may be a ground bus. Placed orthogonally and in juxtaposition to the plated wires 21–32 are the drive lines I′1, I′2, I′3 and I′4. One end of the drive lines are connected to respective driving circuits and shift registers 40 and 42, respectively, and the other ends thereof terminate at ground potential. The intersection of a drive line and a plated wire comprises a bit of a memory word. The memory organization of FIGURE 2 is the same as that of FIGURE 1, that is, there are four words in each word group, and each word has 12 bits. The memory arrangement of FIGURE 2 however operates by reading and writing in parallel in distinction to the serial by bit operation of FIGURE 1.

It should be noted, however, that the word orientation of FIGURE 2 is transposed 90° from the orientation of FIGURE 1. In other words, the entire word lies underneath one drive line in FIGURE 2 whereas in FIGURE 1, many drive lines are required to make up a word. Thus, the first bit of the word I'1 is *m* and the last bit of the same word is *n*. In like manner, the first bit of word II'1 is *m'* and the last bit of the same word is *n'*. It should be noted that once again there is a separation between word group I' and word group II'.

In the embodiment of FIGURE 2, the recording of information is identical with that of FIGURE 1, namely, a binary one or binary zero in recorded in a particular bit position by energizing the required drive line and simultaneously supplying steering currents of proper polarity by means of the respective digit drivers 20.

Suppose that it is now required to write or record new information in the memory address location identified by I'4. This new information is recorded by energizing drive line 23 and simultaneously and in parallel supplying proper polarity steering currents along the plated wires. The information in each of the memory addresses of word group I' beginning with word I'1 is then read out into respective sense amplifiers 43 and stored in registers. As is understood, read out requires that the required drive line only be energized in order to induce a signal in the plated wires 21, 22–32. This same information is then re-recorded in the same memory location, by causing the digit drivers 20 to energize the respective digit lines *m–n* with the proper polarity steering current and at the same time energizing the required drive line I'. In a similar manner, information in word I'2 is read out, the same information is re-recorded and so on until finally, the new information recorded in I'4 is read out and then re-recorded. When the information in word I'4 is re-recorded, this completes the re-recording of information in word group I'. The shift registers of the word and digit drivers determine when the cycle is completed. The line 41 indicates that the word drivers 40 and 42 are energized simultaneously with the digit drivers 20 whenever information is being recorded. In other words, a particular word group has all the information re-recorded in all address locations whenever any one address has new information recorded therein.

In this manner, the information recorded in the various bit positions of the three words I'1, I'2 and I'3 is reinforced. Therefore, if the same binary information, for example, were to be re-recorded in the bit position *m* of the word I'4, there would not be any effect upon the bit *m* of the word I'3. The reason for this is that the information stored in the adjacent bit positions to the bit position having new information recorded therein would be reinforced by the re-write cycle for the entire word group I'. Hence, the information in bit location *m* of word I'4 will not creep into the adjacent bit.

It is also apparent that even in the worst case situation (i.e., recording the same information in bit *m* of word I'4 many times, whereas bit *m'* remains constant but of opposite information) that the gap between word group I' and II' prevents creep along the plated wire 21.

This recording of information in accordance with the method provided in FIGURE 2 permits improved packnig density since creep is virtually eliminated. As a matter of fact, the instant invention allowed packing density up to 2000 bits per square inch or better and therefore, a hundred million bit memory is realizable.

While the above described invention has been with respect to a memory element having a continuous magnetic medium (i.e., a plated wire) it should be understood that the instant invention is not necessarily restricted thereto and the teachings herein may be readily applied to other memory devices.

In summary, this invention provides for an improved memory organization which permits better packing density of the memory. One embodiment provides that different bits of the same memory word be located along the same plated wire and adjacent words along the wire be separated by a larger distance than that between drive lines in a word. This embodiment writes in and reads out information serially by bit. Furthermore, the number of adjacent bit disturbs is bounded.

In another embodiment of the invention, the memory is organized in the conventional manner, but provides that whole blocks of words will be re-recorded every time that new information is to be written in any one memory address of a group. Groups of these words are also separated from one another.

Obviously many modifications and variations of the present invention are possible in the light of the above teachings. It is therefore to be understood that within the scope of the appended claims, the invention may be practiced otherwise than is specifically described.

The embodiments of the invention in which an exclusive property or privilege is claimed are defined as follows:

1. An array of magnetic storage elements formed into words and further being formed into word groups, said elements of a word being disposed with respect to one another such that a flux signal affecting any one element can affect adjacent elements to said one element; means which will reinforce the magnetic state of each element of at least one said word in a group during a recording cycle in order to minimize creep between the bits of a group.

2. A memory organization comprising, at least one wire having a magnetic covering which can be magnetized in one of two remanent states, said wire adapted to be connected to a bit driver; a plurality of drive lines positioned in juxtaposition to said wire to form a plurality of words wherein the intersection of a drive line and a wire defines a bit location, said words being separated from each other along said wire at a distance to minimize creep between adjacent bits of a word and further, between the last bit of one word and the first bit of a juxtaposed word.

3. A memory organization comprising, at least one wire having a magnetic covering which can be magnetized in one of two remanent states, said wire adapted to be connected to a bit driver; a plurality of drive lines positioned substantially orthogonal to said wire to form a plurality of words and the intersection of said wire and one of said drive lines forming a bit of said word, said words being separated from each other by a distance which is greater than the distance separating the bits of a single word in order to minimize creep between word bits of a group.

4. A memory organization comprising, at least one wire having a magnetic covering which has a preferred axis of magnetization and which can be magnetized in one of two remanent states, said wire adapted to be connected to a bit driver and to a shifting means; a plurality of drive lines adapted to be connected to an energizing and shifting means and positioned in juxtaposition to said wire to form a plurality of words, wherein each word is formed by a plurality of said bits and are separated from each other along said wire, said individual words being recorded serially by bit in order to minimize creep between adjacent bits of a word and further, between the last bit of one word and the first bit of a juxtaposed word.

5. A memory organization comprising, a plurality of wires arranged substantially parallel to one another, each said wire having a magnetic covering which can be magnetized in one of two remanent states; a plurality of drive lines positioned substantially orthogonal to said plurality of wires, the intersection of each said drive line and said plurality of wires forming a memory word, said plurality of drive lines and said plurality of wires being formed into at least two word groups which are separate and distinct from each other wherein the separation between said word groups is greater than the distance between adjacent drive lines, means for writing new information in one word of a group and rewriting the same information in the remaining words of the same group.

6. A memory organization comprising: a plurality of wires arranged substantially parallel to one another, each said wire having a magnetic covering which can be magnetized in one of two remanent states; energizing means connected to said wires; a plurality of drive lines positioned substantially orthogonal to said plurality of wires, the intersection of each said drive line and each said wire forming a memory bit and a plurality of said bits along a drive line forming a memory word whereat information is stored, said plurality of drive lines and said plurality of wires forming at least two word groups, said word groups being separated from each other by a distance which is greater than the distance between adjacent drive lines of a group, means coupled to said drive lines and to said energizing means to cause all the words of a group to be re-recorded when new information is recorded in one word of said group.

7. A memory organization comprising: at least one wire having a magnetic covering which can be magnetized in one of two remanent states, said wire adapted to be connected to a bit driver; a plurality of drive lines positioned in juxtaposition to said wire to form a plurality of words and the intersection of said wire and any one of said drive lines forming a bit of a word, said words being separated from each other along said wire by a distance which is greater than the distance separating the bits of a single word; means coupled to said wire and said plurality of drive lines to record information in any word serially by bit in order to minimize creep between adjacent bits of a word and further, between the last bit of one word and the first bit of a juxtaposed word.

8. In a random access memory comprising: an array of magnetic storage elements adapted to store binary information which is divided into words and word groups, said elements being disposed with respect to one another such that a recording signal affecting any one element can affect adjacent elements to said one element; means coupled to said magnetic storage elements of a word in a group which will reinforce the binary information stored in each of said adjacent storage elements when said one element has information recorded therein by said recording signal in order to minimize creep between adjacent bits of a word as well as between the last bit of one word and the first bit of a juxtaposed word.

9. An array of storage elements stored on a continuous magnetic medium and adapted to store binary information, said elements being divided into a plurality of words and word groups, means for recording information into one of said words of a group such that the magnetic disturbance of adjacent elements thereof is bounded in order to minimize the creep effect along said magnetic medium.

10. An array in accordance with claim 9 wherein said storage elements comprise memory locations along a plated magnetizable wire having the property of uniaxial anisotropy.

References Cited

UNITED STATES PATENTS

| | | | |
|---|---|---|---|
| 3,011,158 | 11/1961 | Rogers | 340—174 |
| 3,257,650 | 6/1966 | Koerner | 340—174 |
| 3,221,312 | 11/1965 | MacLachlan | 340—174 |
| 3,257,649 | 6/1966 | Dietrich et al. | 340—174 |
| 3,278,913 | 10/1966 | Raffel | 340—174 |
| 3,311,893 | 3/1967 | Landell | 340—174 |
| 3,311,901 | 3/1967 | Fedde et al. | 340—174 |

BERNARD KONICK, *Primary Examiner.*

J. F. BREIMAYER, *Assistant Examiner.*